United States Patent [19]

Polster

[11] Patent Number: 5,445,062
[45] Date of Patent: Aug. 29, 1995

[54] COOKER/RETHERMALIZER

[76] Inventor: Louis S. Polster, 2205 Marthas Rd., Alexandria, Va. 22307

[21] Appl. No.: 65,627

[22] Filed: May 21, 1993

[51] Int. Cl.6 .......................... A23L 3/00; A47J 27/122
[52] U.S. Cl. .......................... 99/348; 99/450; 99/409; 99/418; 366/107
[58] Field of Search .................. 99/330, 348, 450, 418, 99/415, 409, 403; 366/107, 106, 101

[56] References Cited

U.S. PATENT DOCUMENTS

| | | | |
|---|---|---|---|
| 1,979,222 | 10/1934 | Goodwin | 219/44 |
| 2,024,386 | 12/1935 | Phelps | 219/35 |
| 2,241,337 | 5/1941 | Work | 261/77 |
| 2,683,795 | 7/1954 | Sheidler | 219/35 |
| 2,805,314 | 9/1957 | Michaelis | 219/45 |
| 3,076,976 | 2/1963 | Bogar | 4/180 |
| 3,525,299 | 8/1970 | Gouwens | 99/336 |
| 3,626,840 | 12/1971 | Day | 99/355 |
| 3,788,302 | 1/1974 | Malaney | 126/374 |
| 3,869,972 | 3/1975 | Chase | 99/410 |
| 3,904,852 | 9/1975 | Rivelli | 219/442 |
| 3,919,523 | 11/1975 | Wadia | 219/494 |
| 3,958,503 | 5/1976 | Moore | 99/327 |
| 3,979,056 | 9/1976 | Barnes | 235/92 |
| 4,181,614 | 1/1980 | Steenhorst | 210/221 |
| 4,320,286 | 3/1982 | Borrup | 219/549 |
| 4,384,401 | 5/1983 | Borrup | 29/611 |
| 4,441,016 | 4/1984 | Oota | 219/441 |
| 4,450,757 | 5/1984 | Alfio | 99/327 |
| 4,468,557 | 8/1984 | Bylin | 219/535 |
| 4,489,235 | 12/1984 | Porteous | 219/437 |
| 4,574,183 | 3/1986 | Knauss | 219/438 |
| 4,717,812 | 1/1988 | Makita | 219/528 |
| 4,724,825 | 2/1988 | Fritsch | 126/357 |
| 4,741,261 | 5/1988 | DiMaria | 99/330 |
| 4,741,623 | 5/1988 | Haeuser | 366/160 |
| 4,794,228 | 12/1988 | Braun, Jr. | 219/415 |
| 4,803,920 | 2/1989 | Kowalics et al. | 366/101 |
| 4,853,518 | 8/1989 | Bravo | 219/441 |
| 5,009,150 | 4/1991 | Andersen | 99/360 |
| 5,097,759 | 3/1992 | Vilgrain | 99/330 |
| 5,103,801 | 4/1992 | Herring | 126/374 |
| 5,265,523 | 11/1993 | Mino et al. | 99/450 |
| 5,284,085 | 2/1994 | Palm | 99/348 |

OTHER PUBLICATIONS

Chester-Jensen Co., Inc. "Cook-Chill a Giant Step".

Primary Examiner—David A. Scherbel
Assistant Examiner—Reginald L. Alexander
Attorney, Agent, or Firm—Price, Heneveld, Cooper, DeWitt & Litton

[57] ABSTRACT

A food cooker/rethermalizer especially suited for cooking or for reheating of prepared, packaged meat and sauce entree items, and optionally for cooking vegetables. The apparatus includes a multiple of food item receiving locations defined by a locator rack, and fluid ejecting tubes beneath the locations to eject fluid such as air therefrom, which rise over the package surfaces for bath mixing and efficient and uniform heat transfer. The tubes include a pair of upwardly sloped conduits oriented in opposite directions and which eject fluid at the upper ends of the tubes, on opposite sides of the bath, to cause circulation of the heated liquid bath. The bath is heated by resistance coils embedded in rubber bonded to the outside of the vessel. The bath level is controlled by a dual temperature sensor device, one sensor above the other, to detect a predetermined temperature differential and activate a water supply valve to inject only small quantities of water. The heating chamber is separated from the electronics control chamber by a space which has a thermally generated convection cooling action. The defined locations of the locator rack have a geometric arrangement matching the geometric arrangement of controls on a control panel.

If the unit is used to cook pasta, the rising fluid not only assists with bath mixing and cooking action, but also keeps the pasta from sticking together, while the sloped ejection tubes of the basket function to eject starch floating on the bath out of the vessel.

33 Claims, 6 Drawing Sheets

COOKER/RETHERMALIZER

BACKGROUND OF THE INVENTION

This invention relates to a heating apparatus, particularly a food cooker and/or rethermalizing apparatus.

Food Service food preparation in recent years has involved convenience foods or convenience packaged foods for easier preparation or cooking. Typically, this involves one of two known techniques using flexible film packages, namely: 1) so-called "cook-chill," and 2) so called "sous vide". These two are known to be excellent systems for supplying high quality, nutritious, previously prepared food, ready for reheating to provide meals. The technique known as cook-chill involves soups, sauces, and other products of pumpable consistency. The product is cooked at a facility separate from restaurants, or the like, where it is pumped into strong plastic casings, closed by clipping or heat sealing, then chilled and kept under refrigeration, optionally frozen. Non-traditional cook-chill products such as pasta, rice, and vegetables are also becoming popular.

In contrast to this cook-chill technique described above, the sous vide technique involves packing of raw or partially cooked products into plastic pouches under vacuum, then cooking, and finally chilling either to frozen or nonfrozen condition.

Sous Vide technique is typically used for a variety of meat or fish entrees. These refrigerated, vacuum packaged foods are then reheated in selected groupings at the restaurant or other location, in response to customer orders. Experience has demonstrated that such carefully prepared food items can be of excellent quality, satisfactory to even the most discerning palates.

When properly treated, these previously prepared foods enable serving of high quality food without having the expense and complications of a talented chef on staff at restaurants and/or institutions, or without requiting extended cooking time if done at home. Preparation can be rapid, relatively inexpensive, and far less complex than in a typical operation.

The excellent quality of this food preparation technique is too often lost in the reheating process. The difficulty has been found to occur largely as a result of inaccurate temperature control and/or variable heat transfer rates during the reheating process. In fact, proper heating has been found to be critical to high quality results. Heating in boiling water tends to destroy food quality. Placing the packages in hot water below the boiling temperature for a selected time may or may not result in satisfactory food. The resulting temperature of the food product may be too high or too low. What can occur is that a meat serving, for example, is overheated and tough while another portion is not fully heated. Efforts have been made to circulate the reheating water medium by using circulation pumps as in Vilgrain et al U.S. Pat. No. 5,097,759; but this is not considered an adequate solution for consistent food quality. The bath water does not flow evenly over all surfaces, but rather takes the path of least resistance. Further, the bath water tends to stratify into thermal layers of different temperatures. It has been determined that the bath tends to heat unevenly. Even if the heat is spread over the surface of the vessel, it will separate into laterally adjacent zones, each having a width of about six inches or so. These all tend to prevent controlled temperature cooking or reheating in a hot water bath. Controlled proper heating or rethermalizing of the servings is further complicated by the fact that several different packages of different food are typically put into the bath during a particular time period, and these are inserted at different times in response to successive customer orders received. Hence, even though complexities due to meals not being totally prepared by the restaurant kitchen are bypassed, still the cooking or rethermalization of many individual meals and various components of those meals can become chaotic and difficult to properly perform.

Portions of food products in flexible film packs have only, until now, been cooked successfully in Sous Vide or Cook Chill preparation facilities wherein the equipment is large, special purposed, and monitored by computers including special temperature probes inserted into food portions in the processing chamber.

In general, standard restaurant or home reheating/cooking equipment is unsuited to cooking and poor at reheating food products in flexible film packages. The standard equipment is characterized by poor control of operating temperatures. Cooking is accomplished using a cooking fluid of water, air or oil. Temperature differences in an oven typically amount to 20° F. and can significantly affect quality unless a chef is there to interrupt or modify the cooking process appropriately. Even so, air transfers heat so much slower than water and has very little stored energy, so the oven is somewhat forgiving when cooking unpackaged food, but is unsuited to cooking or reheating flexible film packaged food.

Fryers use oil or shortening as the temperature transfer media and have very sophisticated control systems to hold temperatures within a few degrees. Even so, they require either a chef of great experience to monitor the cooking or the even more sophisticated frying computers as in Polster U.S. Pat. No. 4,362,094 to achieve consistent quality cooking. The operating temperatures of fryers is unsuited to cooking or reheating flexible film packaged food.

Pots or pans of hot or boiling water are good for cooking eggs and vegetables. They are unsuited for cooking or reheating flexible film packaged food.

Typical Bain Marie's have a heater in the bottom of a large bath of water. Often a temperature control is used to control the temperature of the bath. If a load of food product is introduced into one portion of the bath, the remaining portion of the bath will either go to a much higher temperature (often boiling) or the area where the food has been introduced will drop in temperature depending on where the temperature control sensor is located. In either case all or some of the food will be heated at the wrong temperature and in one case the remaining area of the bath will be at the wrong temperature for the introduction of more food products.

In restaurant kitchens, another known severe problem that significantly affects cooking is water level control for heating bath vessels. Water level is typically established manually by adding cold or hot water to the heated vessel to replace water lost by evaporation and by water transfer with the packaged food items removed. Adding this water to a heated vessel, usually in a significant quantity by the time the bath decline is noticed, typically causes a significant temperature change, usually a decline, in the bath. Even if heated water is added, its temperature will most likely be many degrees different from the bath temperature. This alters the cooking/reheating process and thus alters the time required to cook or reheat the food items in the bath.

When cooking pasta in boiling water, the action of the boiling keeps the pasta from sticking together. Most modern pasta cooking systems have a perforated basket that drops into the boiling water and contains the pasta to be cooked. The boiling action does not occur within the perforated basket and the operator is obligated to stir the pasta while cooking to keep it from sticking together. Therefore modern pasta cooking systems actually cook pasta in hot water which does not have enough circulating action to properly cook it.

Another more subtle obstacle to proper cooking/reheating in a water bath has been discovered to be the standard proportioning temperature control technique which compensates for lag time and the thermodynamics of the water bath itself. The problem is that such techniques are not responsive to highly variable loads. Therefore in order to avoid the disasterous overshoot of temperature of an on-off control system, the recovery time of a proportioning temperature controlled water bath varies dramatically with load which changes the time to cook significantly. This problem is unobvious as the water bath seems to perform by properly coming to temperature without overshoot and the variations in cooking are mysterious.

When dealing with hot water baths, even 5° F. significantly changes the texture of many foods to be cooked. Temperatures should be held within about 2° F. of the optimum temperature. Circulation of the fluid helps to prevent temperature layer stratification, but circulation alone without exact bath temperature control is not enough. Further, the presence of circulation does not necessarily assure even flow over all surfaces of the food items. This flow over all surfaces of the food items is important for proper cooking or reheating. The mere presence of the food items disturbs the circulation pattern of any cooking vessel, with the fluid taking the path of least resistance and not the paths between all the food items, especially if the paths are narrow. Fluid dynamics in the cooking vessel present problems.

It has been found by the inventor herein to be important, for proper cooking or rethermalization, that the temperature be retained in a closely controlled range, for there to be totally efficient heat exchange with the surfaces of each of the several packages or items of food being cooked or reheated, for each item to be heated in accordance with the type of food in the package, i.e., for each type of entree, sauce, pasta, and vegetable etc. to be heated for an exact predetermined amount of time and at a temperature which is optimum for that entree or sauce. Achieving these results with present cooking or rethermalization equipment does not dependably occur. As noted, if too high a temperature is used, the food becomes overcooked and the texture is adversely affected. If too low a temperature is used, the food is not properly cooked. If the temperature changes, the food chemistry changes.

It has also been found that vegetables can be cooked in the water bath, using the above mentioned principles, loose or in a perforated flexible film package, or reheated after initial cooking and vacuum packaging.

Another discovery was that the bubbles uses to vertically pertebate the water bath between food packages kept pasta from sticking together even though the bath was not boiling. The bubbles also facilitated the removal of the starch that is cooked out of the raw pasta. The starch and a small amount of water was then found to be removed from the bath by the bubble driven circulation system. The water level control system made up the water lost removing the starch.

SUMMARY OF THE INVENTION

The inventor herein has developed a unique apparatus for cooking or rethermalizing food. It achieves fluid flow action over the surfaces of all of the food packages in a cooking or rethermalizer vessel, for excellent heat exchange with the packages. The invention provides a unique cooking/rethermalizing apparatus and system which effects uniform cooking, or uniform reheating of individual portions of previously prepared and packaged food. The apparatus effects uniform heating of food items, even when placed anywhere in the heating bath at different times. At the time the food item is placed in the bath, retained by food locating and support means, the particular type of food item and its location in the bath are entered in a controller which has a control panel that visually corresponds to the geometry of the defined locations of the locator rack in the thermalizing bath. Each food serving is uniformly and properly heated. Each package is retained in position, separated from other packages, in a locator rack retainer which employs a unique fluid generator system, preferably for generating bubbles, to simultaneously, 1) hold the packages in proper orientation in locations, 2) separate the packages from other packages in these locations, 3) cause flow over all of the package surfaces in all of the locations for uniform efficient heat exchange, and 4) cause bath liquid circulation within the vessel throughout the several defined locations. The retainer is an open top, open mesh locator rack which defines these locations for the packaged individual food items, and has tubes to generate flowing fluid, preferably air bubbles, between all the locations for causing fluid scrubbing over all of the package surfaces as the bubbles rise to the surface. This flow action causes excellent heat exchange at the package surfaces, as well as elimination of temperature stratification for accurate and efficient heat transfer to the food. The tubes preferably include diagonally, upwardly, outwardly oriented, i.e, sloped, tubes or ramps extending in opposite directions on opposite sides of the vessel, for discharge of a fluid, preferably a gas such as air, in opposite directions, causing the bath to circulate continuously.

Another object of this invention is to provide a cooking/rethermalizing vessel bath level control using specially arranged and cooperative temperature sensors. Controlled automatic injection of small quantities of replacement water occurs frequently, as necessary. The only openings needed in the vessel itself are the open top and a bottom drain. The invention herein uses a unique, vertically displaced, temperature sensing and responsive water level control system. It senses temperature differential between different vertical locations of the vessel, to cause added water to be included in small regular quantities as needed. The sensors are vertically spaced on the outside of the vessel, to detect the temperature differential between a portion of the vessel constantly containing the heated bath and a portion which may or may not contain the heated bath, to control replacement water input in response to this temperature differential sensing.

The vessel is heated in laterally adjacent zones for control. Further, a temperature sensor is located on the vessel for each zone, near the heater to cooperate with sensors near the vessel bottom, to compensate for lag time, i.e., thermal momentum, and thereby prevent serious overshoot of the rising temperature above the optimum temperature desired. This arrangement minimizes recovery time.

Another object of this invention is to provide cooking/rethermalizing bath apparatus enabling direct easy control and monitoring of individual servings of food placed in the bath, even though the items are of different foods, even though they are placed in the bath at different times, and in different parts of the bath. The food retaining means in the bath has its plurality of locations arranged in a geometric pattern which visibly anti pictorially corresponds to a similar control panel geometric pattern, with a timer control and indicators for the respective locations.

The housing of the rethermalizer has its control system mounted in an electronic control chamber separated from the cooking chamber by a pair of spaced vertical walls, the space between the walls being vertically elongated and having openings at the bottom and at the top thereof to cause thermally generated air flow entering at the bottom and departing at the top, thereby effecting a cooling action/thermal isolation over the wall of the electronic control chamber. This creates a chimney type flow, convection cooling action that isolates the control chamber from the cooking vessel.

Another object of the invention is to provide a cooker/rethermalizer which can serve as a special cooker for pasta. The present invention enables pasta to be cooked in a container inside the main bath vessel, with fluid flow action up through the pasta inside the container for uniformly cooking, preventing the pasta from sticking together and for elevating starch to the surface.

Furthermore, the novel apparatus automatically removes the cooked starch floating on the surface of the bath, achieving this discharge by the same fluid flow tube structure which circulates the bath. The floating starch is upwardly, outwardly ejected from the vessel by fluid ejected from the ends of diagonally, upwardly, outwardly oriented tubes. As noted, these tubes include a pair on opposite sides of the cooking vessel, to also cause circulation of the liquid bath. Another object of this invention is to provide a cooking/rethermalizing system that allows separate temperature control of laterally adjacent bath zones in the vessel, to match the zone heat input to the load of that zone, and in a fashion minimizing temperature overshoot in another zone.

DESCRIPTION OF THE PREFERRED EMBODIMENT

Figure 12:
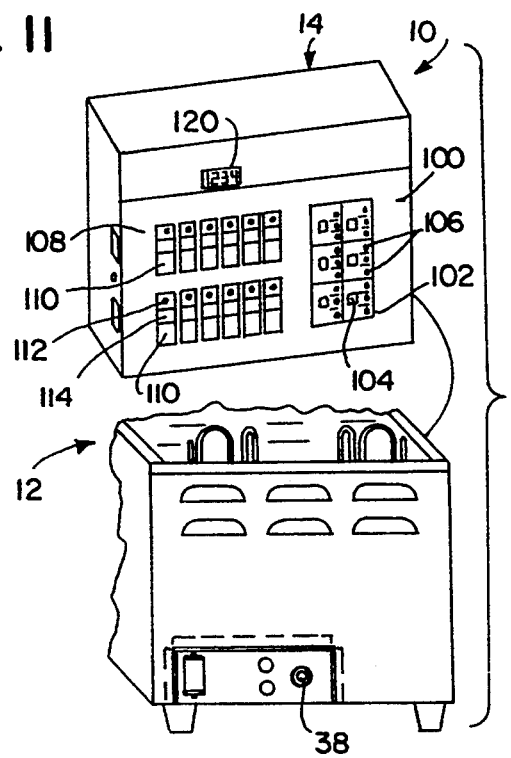
FIG. 12 is a front elevational view of the cooker/rethermalizer and its control system.

Referring now specifically to the drawings, the complete combination 10 (FIG. 12) of the cooker/rethermalizer assembly 12 and the control module assembly 14 are there illustrated.

The assembly 12 includes a housing 18 made up of a plurality of four walls, i.e., two side walls 20a, a front end wall 20b, and a rear end wall 20c. Housing 18 rests upon a plurality of feet 28, and is divided into two chambers, namely a heating chamber 22 (FIG. 5) and an electronic control chamber 24. These chambers are separated from each other by a vertically elongated, transverse space 26 having the rear heating chamber wall 22a on one side and the front electronic control chamber wall 24a on the other side. Electronic control chamber 24 includes three outside walls and inside wall 24a. Space 26 extends transversely across the entire unit, having one or more openings 26a at the bottom thereof for entry of cooling air and one or more top openings 26b, preferably into heating chamber 22, for flow of air out of space 26. Thermal energy from chamber 22 creates a chimney-type convection flow effect relative to space 26, the thermally generated air movement thus constantly moving up through space 26. This cools wall 24a and thus thermally isolates control chamber 24 from heating chamber 22, to maintain the electronic control components relatively cool, i.e., at a significantly lower temperature compared to that of heater chamber 22. In the front wall 20b is a pair of outlet vents 20d to allow heated air from chamber 22 to escape. The side walls of the control chamber 24 include a plurality of vents 20e, and rear wall 26c includes a further plurality of vents 30f, enabling the electronic control chamber 24 to be flushed constantly with cool ambient air.

Within heater chamber 22 is a heater vessel 30, preferably of stainless steel, and having four side walls 32, i.e., a front wall, a rear wall and two lateral walls, all integrally joined, as well as a bottom wall 34 integrally joined with the four side walls to form an open top vessel. Other than the open top, the only opening into the vessel is a drain outlet conduit 36 in vessel bottom 34. This drain may be controlled by a valve actuator 38 which protrudes from the front of the rethermalizer housing.

Within vessel 30 is placed a special food item retaining locator rack 40 depicted in FIGS. 2, 7, 8 and 9. This locator rack comprises an open mesh type of structure formed of elongated elements, largely wire-type or tubular-type elements, preferably of stainless steel metal, forming a bottom and four upstanding walls. Several portions of these elements are specially adapted to conduct fluid, preferably gas and normally air, but potentially fluid such as water, therethrough, in a manner explained hereinafter for purposes explained hereinafter. It is not necessary that all components of the locator rack be hollow or that they all be capable of conducting fluid, but it is significant that they be constructed so that fluid discharge will emanate therefrom into the heated fluid bath in a manner causing bath mixing action and flow along the surfaces of all of the packages of food placed in special defined locations defined by the locator rack. In the preferred embodiment depicted, there is an elongated wire element 42 (FIG. 7) which extends the length of the rectangular shaped locator rack depicted, this being shown to run through the center of the rack dividing it into two visual major locations. Two roughly triangular elongated wire elements 42a define the sides of the locator rack and provide a place for the U-shaped ramps to be attatched. These three elongated wire elements are shown interconnected by a plurality of bottom transverse wire elements 44 which are normal to elements 42, and here shown to be nine in number, to underlie 18 locations in this embodiment. Two top wires 44a further (visually) divide the locator rack into a total of six primary locations each with three locations totalling the 18 locations, formed by the locator rack. These locations have vertical walls formed by upstanding inverted U-shaped wires 46 attatched to the bottom transverse wire elements 44. The wire elements 44a and 42 thereby divide the basket visually into the primary-locations. Two inverted, U-shaped side handles 48 for lifting the locator rack out of the heater vessel are attatched to wires 42a and 44a.

The locator rack also includes special fluid conducting and releasing tubes. More specifically, one longitudinal pair of tubes 50 extends beneath the 18 locations, each tube extending beneath nine locations on its respective side of the rethermalizer vessel.

Figure 7:
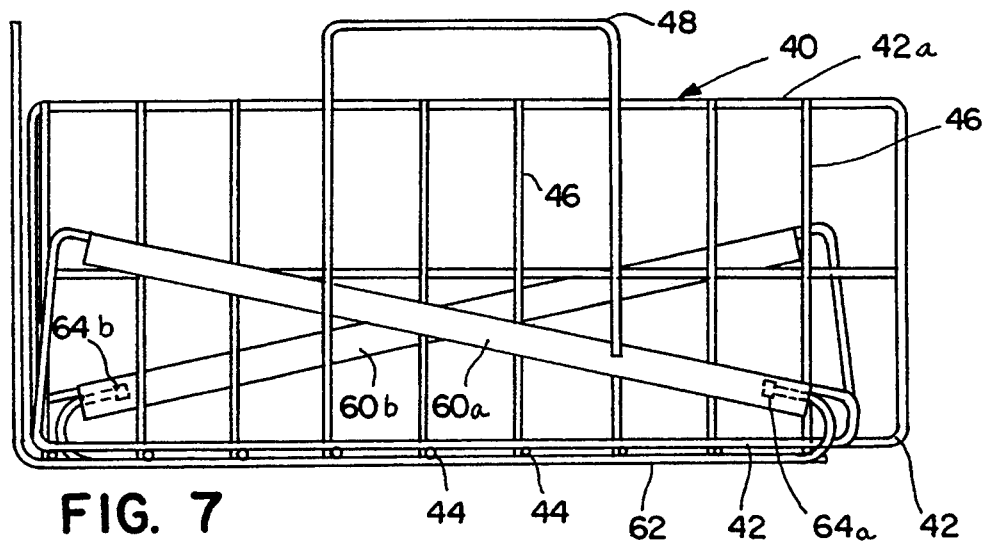
FIG. 7 is a side elevational view of the food item supporting retainer rack, including fluid tubes.
Figure 8:
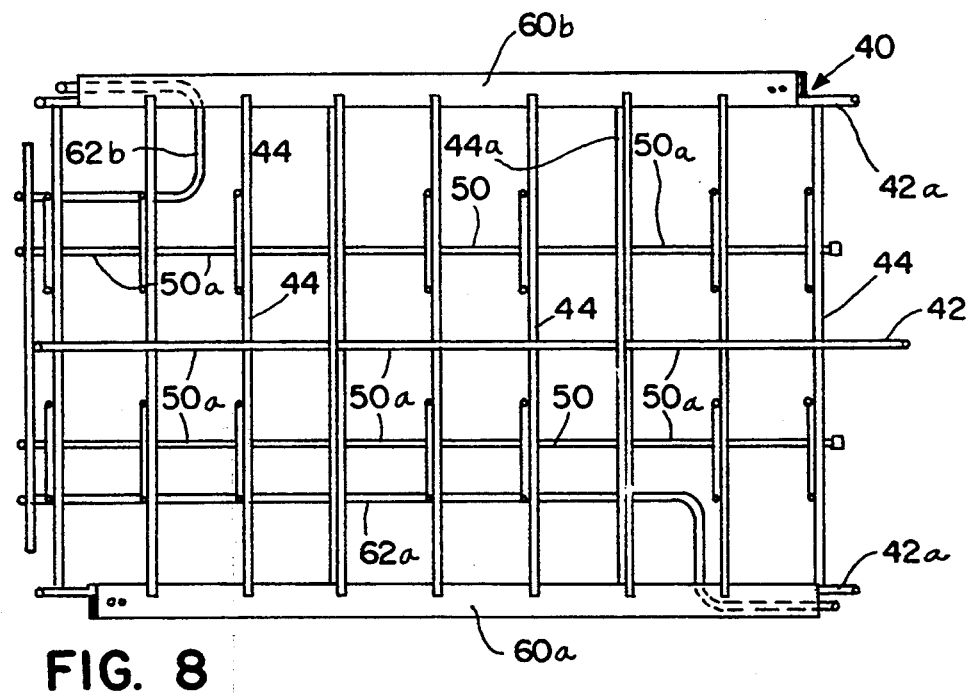
FIG. 8 is a top plan view of the basket in FIG. 7.
Figure 9:
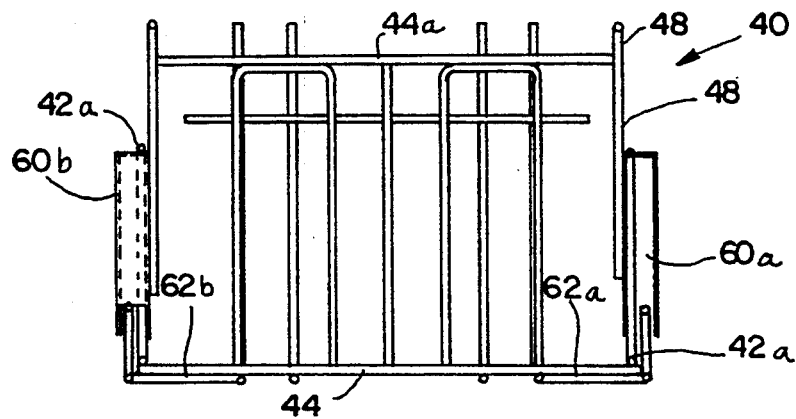
FIG. 9 is an end elevational view of the retainer rack in FIGS. 7 and 8.

Each of these tubes or tubular elements 50 has a plurality of outlet orifices, preferably on the underside thereof, along the length thereof, to allow a pressurized fluid such as gas, typically air, to be ejected from the tubes along the length thereof. Air bubbles thus will form, rising gravitationally to the surface of the aqueous bath contained in vessel 30, moving up over the surfaces of packages of food positioned in the locations defined by the locator rack, thereby mixing and disturbing the bath water over the surfaces of the packages to promote uniform temperature and efficient heat exchange with the food products being heated. On opposite sides of the locator rack are diagonally arranged, upwardly outwardly sloped, inverted U-shaped ramps which are inverted-trough or tunnel-type conduits 60 (FIG. 7). Each of these has an air inlet at one end, namely the lower end thereof, and an outlet at the opposite upper end. These inverted trough-type conduits extend upwardly in the opposite direction relative to each other. Conduit 60a is shown to have an elongated air tube 62a extending along the underside of the locator rack, almost the full length thereof, and then bending lap in a U-turn to a gas outlet 64a (FIG. 7) into the inverted trough or U-shaped member 60a. Any pressurized fluid, e.g., air, passing through tube 62a to outlet 64a will then form bubbles which flow up the sloped inverted trough 60a pushing the bath fluid ahead and both being ejected at the upper end of trough-type conduit 60a in a diagonal direction toward the rear end wall of the rethermalizer. On the opposite side of the vessel, a short hollow tube 62b extends to an outlet 64b beneath the lower end of inverted trough-type tube 60b for ejecting air or other fluid up into and through this trough. The fluid then forms bubbles which flow up the sloped inverted trough 60b pushing the bath fluid ahead and both being ejected at the upper end thereof which faces in the opposite direction, i.e., toward the front wall of the rethermalizer. The flow of the bubbles and bath fluid through the outlets of the tube-type members or ramps 60a and 60b causes circulation of the aqueous bath within the vessel. That is, the two operating together assure constant recirculation of the aqueous bath around the, vessel and through the locations to optimize temperature uniformity by sweeping heated water away from the side and bottom of the vessel and to help reduce the tendency of the water to stratify into thermal planes of different temperature. These hollow fluid tubes 50 and 62a and 62b are each connected to a source of pressurized fluid such as air (not shown) by releasable connectors of conventional type, more specifically, e.g., tubes 50 having quick connect couplings 70 (FIG. 2) and tubes 62a and 62b having quick connect couplings 72a and 72b, respectively.

Figure 5:
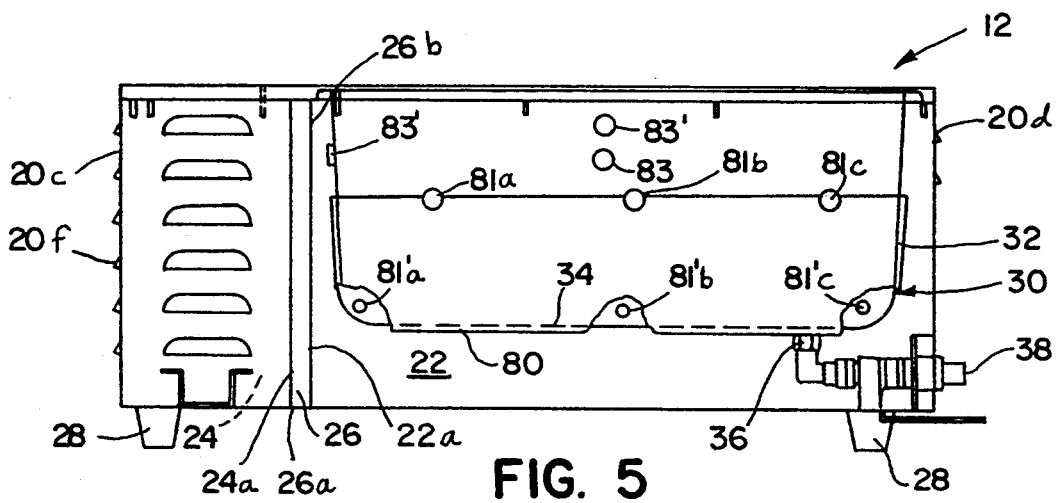
FIG. 5 is a side elevational view, partially in cross section, showing the heater vessel, the bottom drain therefrom, and the double wall between the heater chamber and the control electronics chamber, with the retainer rack for supporting food packages removed therefrom.
Figure 6:
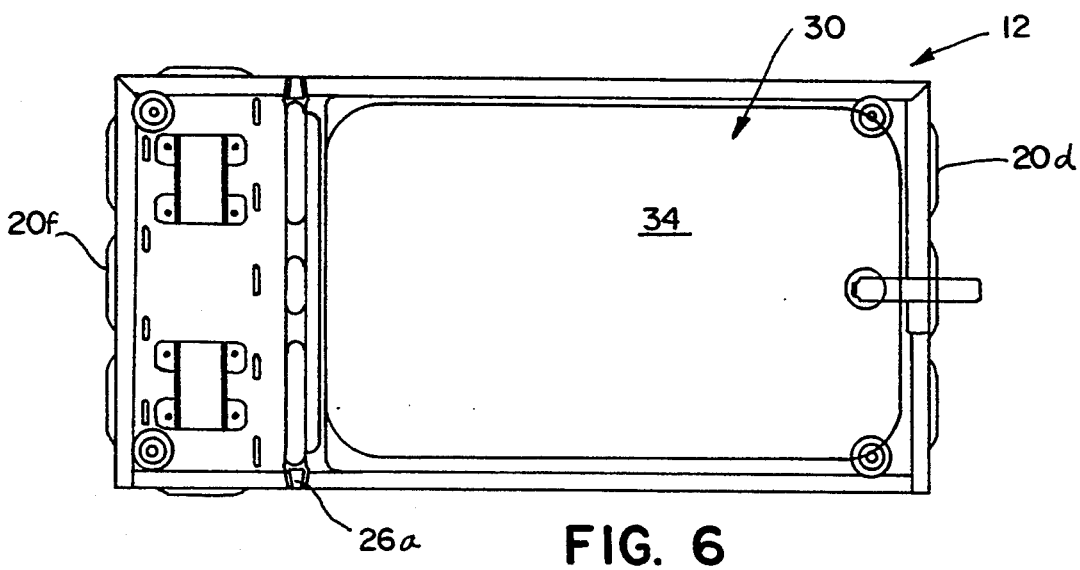
FIG. 6 is a top plan view of the apparatus with the retainer rack for supporting food packages removed therefrom.
Figure 13:
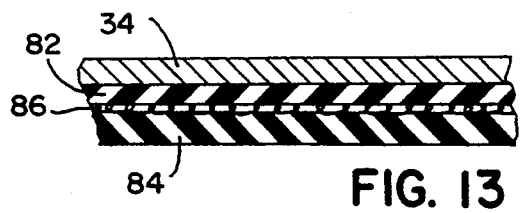
FIG. 13 is an enlarged, fragmentary, cross sectional view of a portion of the bottom of the heating vessel.

Bonded to the bottom and the lower side walls of vessel 30 (FIG. 5) is a heater 80. (FIG. 13). This heater is preferably formed of a pair of layers of rubber-like material, preferably silicone rubber polymer, one layer 82 being bonded to the outside surfaces of the bottom 34 and side walls 32 of vessel 30 (FIG. 13). Embedded between layer 82 and a second polymer layer 84 of rubber-like material such as silicone rubber polymer are electrical resistance coils 86. The embedded coil and rubber layers are therefore formed into an integral part of the heater vessel forming part of the example circuitry in FIGS. 10A and 10B. This circuitry is one possible variation of the control system. Alternate solid state systems could be used as will be apparent to those in the art. As noted in FIG. 10B, these resistance heaters are shown in three zones, heat zone A, heat zone B and heat zone C, sequentially along the length of the vessel (FIG. 5), each heat zone supplying heat for two side-by-side compartments, i.e., six locations, and each heater shown here to be of about 1667 watts. The reason for having the heaters in zones is that uneven loading without zones, if sensed, would heat the entire bath in response to the sensed load causing the rest of the bath to overheat. If the load was unsensed without zones, the loaded section would lower in temperature. Circulation does not instantaneously mix and even out water or other fluid temperatures. Each zone, therefore, is separately heated in response to the temperature sensing devices for that zone, mounted to the outside surface of the vessel. More specifically, each heating element is responsive to the average of the temperature noted by a lower thermal sensor 81' and the corresponding one of the upper thermal sensors 81 (FIG. 5) mounted to the vessel 30 at longitudinally spaced locations adjacent the three zones respectively, and at a position within the heater robber and at a specific distance from the nearest heater coil. The heater layer purposely does not cover the lower comers of the vessel, with two of the lower temperature sensors 81' being mounted to the vessel wall at the comers (FIG. 5). As noted, the average reading on upper sensor 81 and lower sensor 81' is used to control the heater for each zone. The location of the upper sensors 81 adjacent the heater enables these sensors to quickly detect rising temperature so as to compensate for lag time and therefore eliminate temperature overshoot, i.e., potential overrun of the temperature in a zone. The use of the average between the lower and upper sensors minimizes the effect of any tendency of the bath in that zone to stratify in different temperature layers and it makes the control extremely sensitive to load introduction for quick response time.

Figure 1:
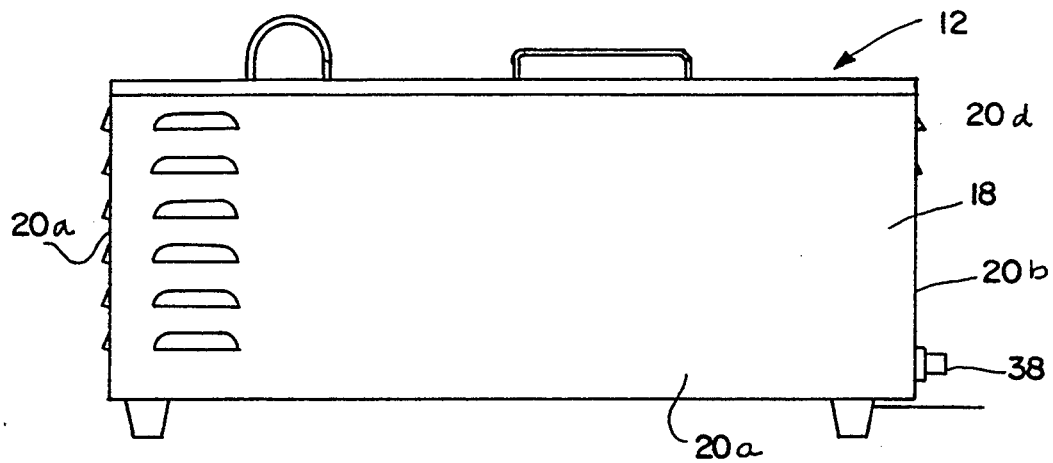
FIG. 1 is a side elevational view of the cooker/rethermalizer of this invention.
Figure 2:
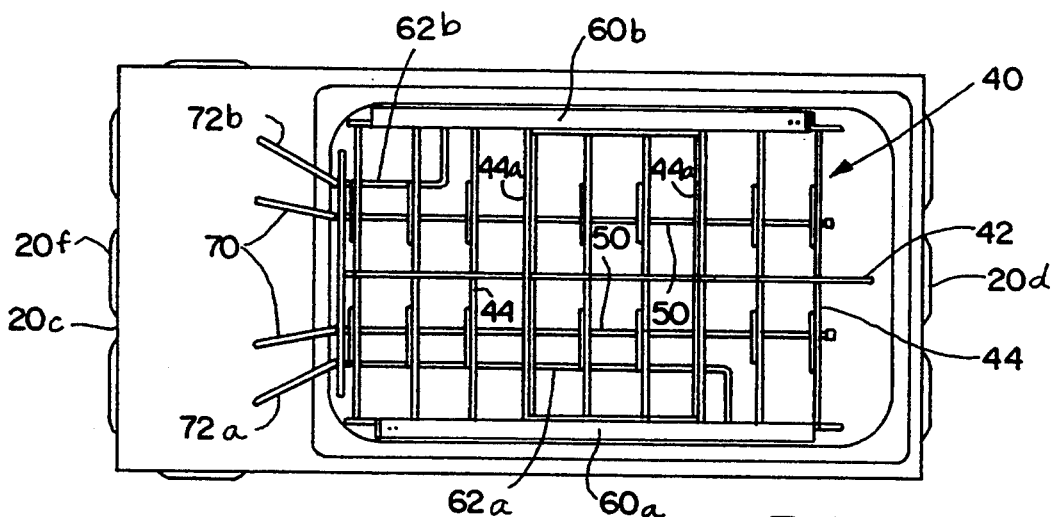
FIG. 2 is a top plan view of the apparatus in FIG. 1.
Figure 3:
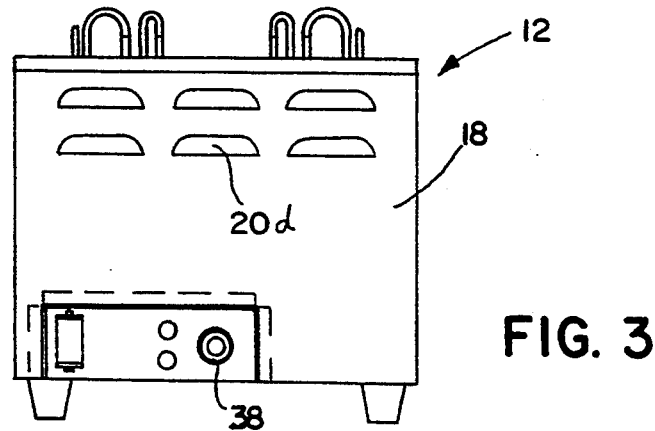
FIG. 3 is a front end view of the apparatus.
Figure 4:
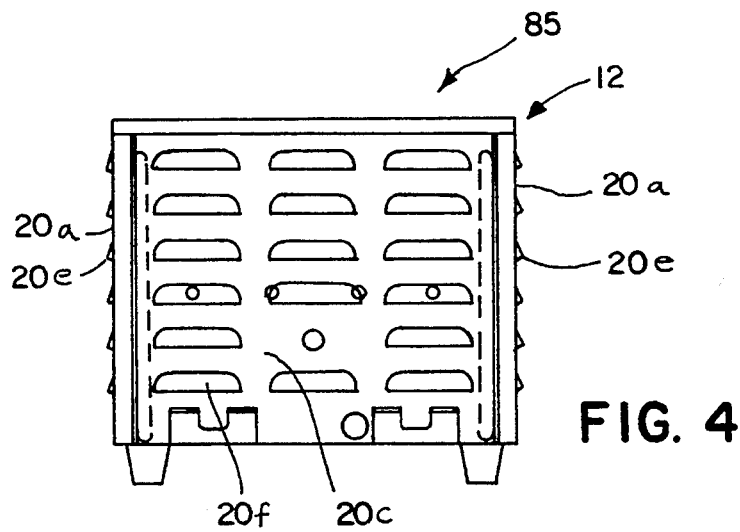
FIG. 4 is a rear end view of the apparatus.

In addition to the three pairs of temperature sensors 81 and 81'(FIG. 5, and see also FIG. 10A) for the heater units, there is also provided a novel bath level control, in the form of water level control, temperature sensors 83 and 83' (FIG. 5 and FIG. 10B), comprising a fourth temperature sensor device in the circuit. Specifically, this fourth sensor device comprises at least one pair of temperature sensors 83 and 83' mounted to outer wall surfaces 32 of heater vessel 30, vertically spaced from each other, the lower one 83 establishing a set point temperature of the vessel wall always in engagement with bath water, and the upper one 83' being located at the height desired for the aqueous bath level above the heater jacket and above sensors 81. The temperature differential between the two sensors 83 and 83' is operably connected with a water supply and control valve 85 (shown diagrammatically in FIG. 4). If the heated water level drops below the level of the upper sensor, that upper sensor will detect a significantly cooler vessel wall temperature than the lower sensor which is still adjacent the heated bath water. At a predetermined temperature differential between them, the sensors activate the water inlet valve 85, allowing a small amount of added water, preferably water heated to the same temperature as the bath, to be incorporated into the bath. This occurs repeatedly on a short time interval basis as the water level repeatedly declines slightly due to evaporation and due to water loss by clinging thereof to the packages removed from the bath. Thus, the overall bath temperature drop occurring with the addition of a small amount of water will never be particularly significant so as to cause excess cooling and upsetting of the cooking process and timing of heating of food packages in the vessel.

Figure 11:
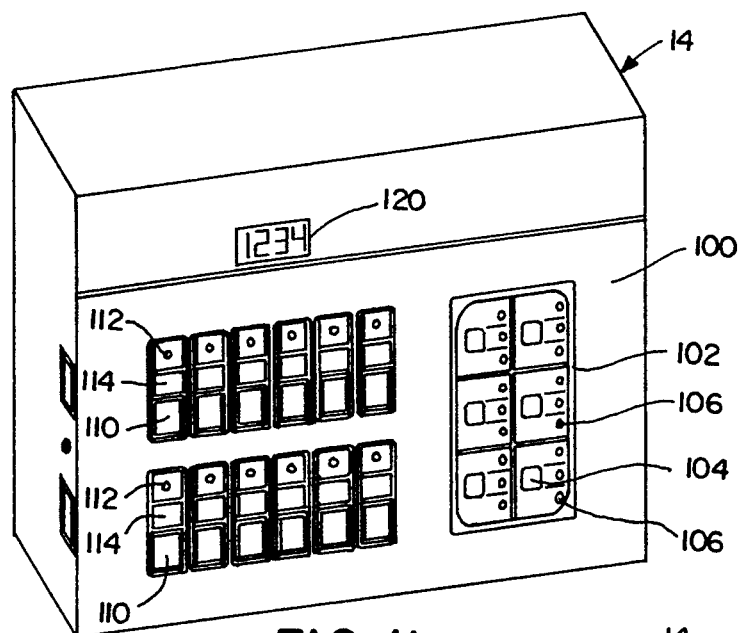
FIG. 11 is a perspective view of the control module with its control panel.

When the cooker/rethermalizer is put into operation, it will be realized that a variety of different meat entrees may be inserted at any one time in the multiple of locations in the locator rack, each requiting its own heating time optimum for that particular type of meat and style of cooking, as well as each independent packaged sauce being heated for a predetermined optimum time. Packages of vegetables may also be placed within certain of these locations and be heated and/or cooked at the same time. Hence, at any one time the process can become quite complex. To simplify the operation of this potentially complex arrangement, the control panel 100 of the controller 14 (FIGS. 11 and 12) is specially graphically designed. One control panel portion 102 has a geometric pattern corresponding to the geometric pattern of the locations of the locator rack in the cooker/rethermalizer vessel. More specifically, referring to FIGS. 2, 11 and 12, it will be noted that the control panel portion 102 for the specific locations is set forth in a graphic manner to have a geometric pattern corresponding to and visually simulating the geometric pattern of the locations in the heater vessel. Therefore, for the 18 locations depicted for the locator rack, there are 18 spaces on the geometric pattern 102, with three primary locations along each side in similar fashion to the rack. These six primary locations each have a "location" timer control button 104 and three "location in use" indicator lights 106 i.e., one light for each of the 18 "locations" in the bath. Also shown on a second control panel portion 108 is a plurality, here shown to be 12 in number, of "product" button switches 110 (in two rows), each having a "product" indicator light 112 and a product label space 114. These label spaces are occupied by labels such as "Beef," "Chicken," or other meat entrees, or labels such as "Bernalse Sauce" or the like, for particular sauce packages, or vegetable labels such as "Carrots," "Cabbage," etc. Each product button is set for the cooking or reheating time of the labelled product.

Operation of the cooker/rethermalizer—timer/controller system starts with one simple rule—within a primary location, load the three locations front to back in sequence (this was done so that only six location buttons were needed instead of the eighteen that would be necessary if there was one button per location). The operator puts a product to be cooked or rethermalized in the "front" location of a primary location, if a "Beef" package is inserted into the first location, such as in the right front corner, first a "Beef" product button switch 110 is pressed on panel 100, causing a product light 112 to illuminate, and then the location button switch 104 is pressed that graphically represents the three locations of the right front corner. The "beef" time is then transferred to the timer for the right front corner and the associated location light 106 for the right front corner illuminates. Within a primary location the nearest to the front unused location can in similar fashion be loaded with a food, its timer product button pushed and then its primary location button pushed ending with a lighted location light with an internal associated timer running.

The operator, by looking at the timer/controller can see which locations have product in them and the digital time display 120 on the control panel 102 counts down the time of the nearest to done food product. This tell nearest to done time lets the operator know when he will next need to act to remove a reheated or cooked food product. When the time for cooking or reheating a food product has elapsed, an audible signal will sound and the location light 106 associated with that food product will blink. The blinking light alerts the operator as to which food product to remove from the bath and which timer location button (within the same primary location as the "done" product) to push to cancel the audible signal and blinking location light. The timer display 120 will then illustrate the "nearest to done" time remaining for the next sequential item to be removed, and so forth.

Optionally, more than one timer display may be provided. Also, there could be a separate timer control button 104 for each location.

Figure 10A:
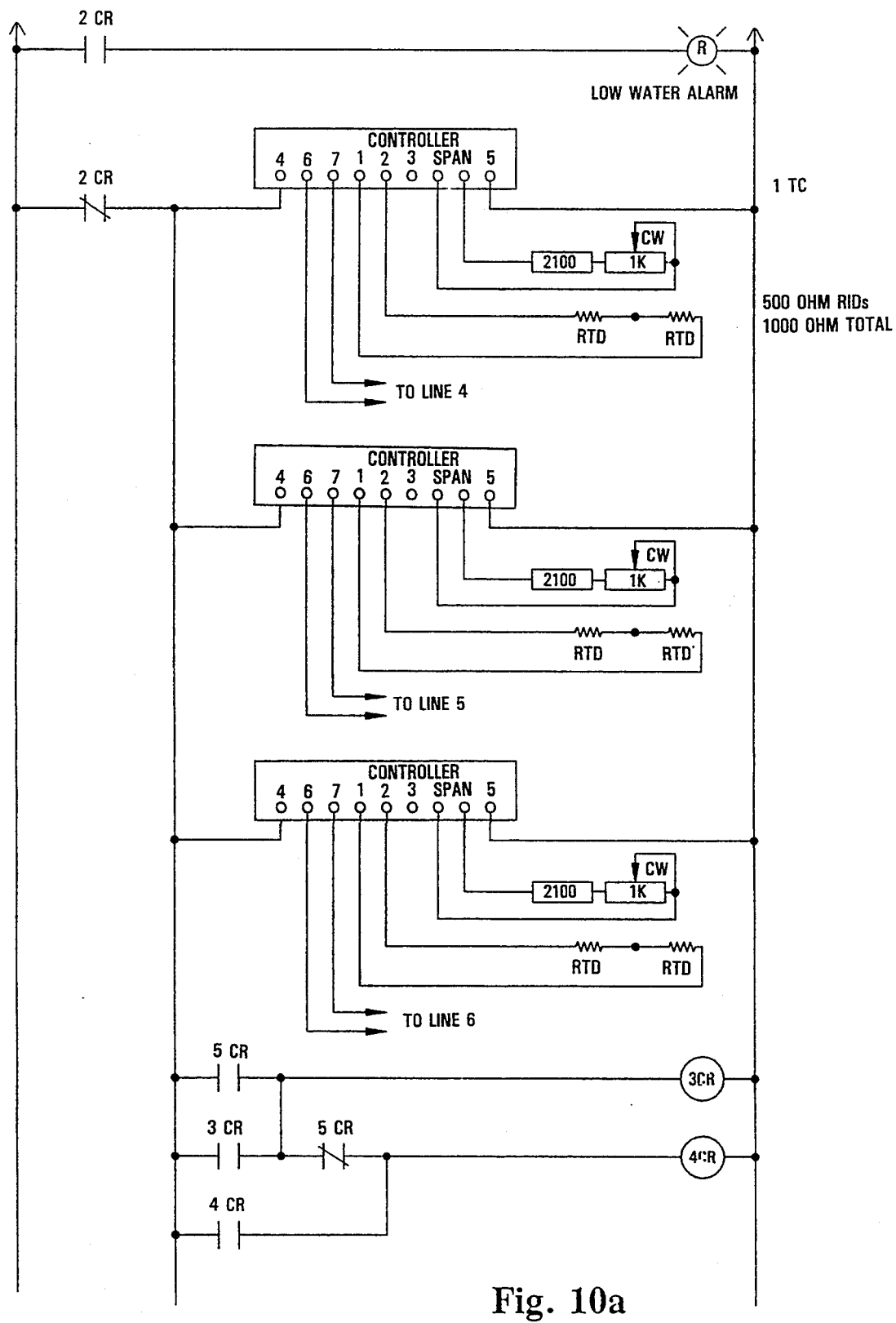
FIGS. 10A and 10B are a circuit diagram of the control system.
Figure 10B:
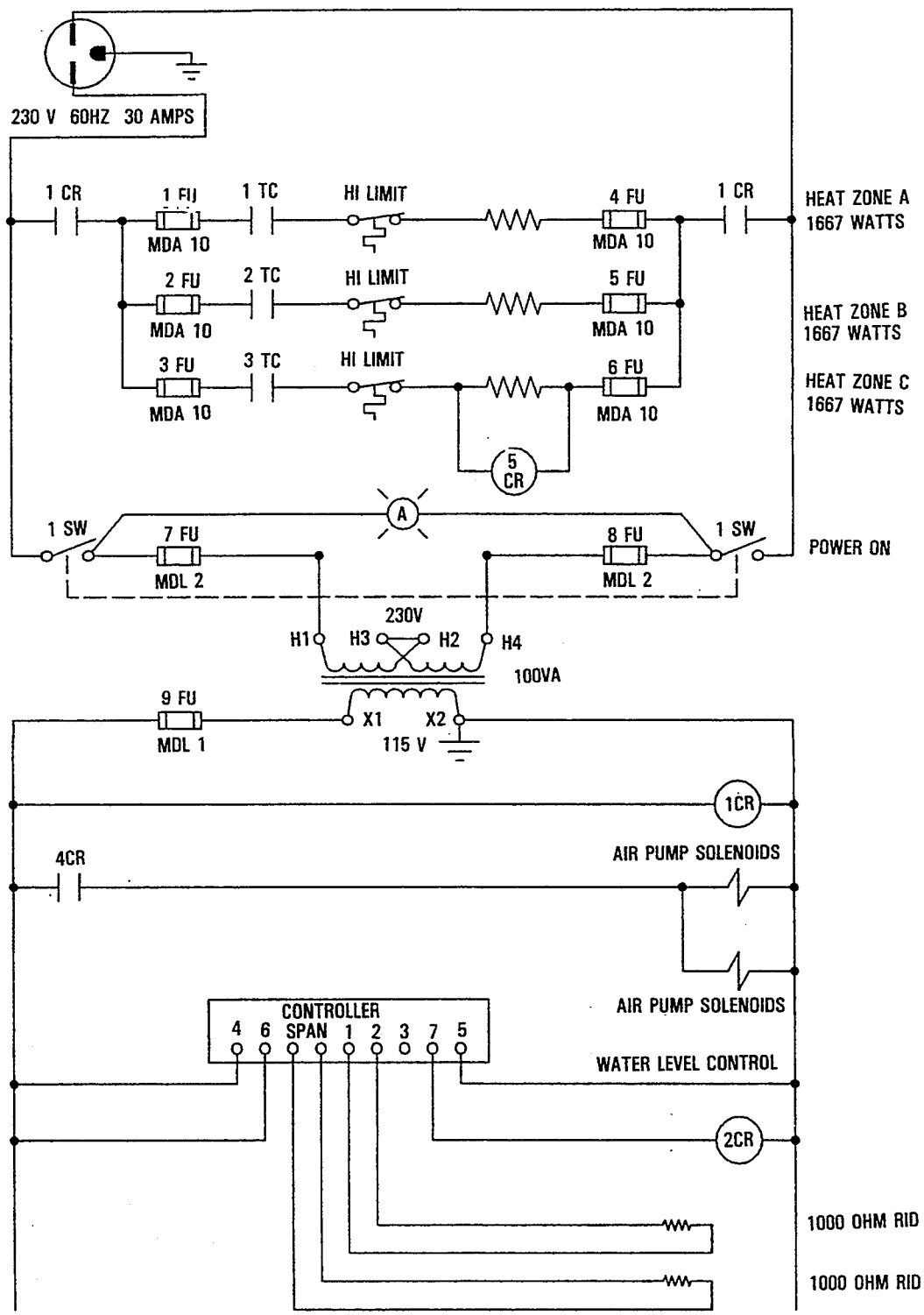

The example circuitry in FIGS. 10A and 10B was employed on the prototype for the invention. It may alternatively be substituted by lower cost, printed circuit boards accomplishing the same basic functions, as noted previously.

In operation, the vessel is filled with water and heated to a preset temperature. The selected temperature may be anywhere between 140° F. (at which bacteria are killed) and 212° F. (boiling temperature), for example 145° F. (for holding food, precooking, medium rare beef, and to be certain to kill bacteria), 160° F. (for cooking chicken or fish), 170° F. (to cook lobster), 180° F. (to reheat or rethermalize food), 200° F. or 205° F. (to cook vegetables) or 212° F. (to cook pasta). The temperature selected is maintained in the bath within about two degrees, by the temperature control sensors and cooperative resistance heaters of this apparatus. Individual packages of previously prepared or raw food, e.g., meat entrees and sauces, are inserted sequentially in the respective locations of compartments of the; locator rack, and zones of the bath, the insertion of each entry being followed by actuation of a product control switch 110 and a location button switch 104 as noted above, thereby activating the digital timer displayed at 120. When the unit is operated, fluid such as compressed air is continuously injected into tubes 50, 62a and 62b. Outlets from tubes 50 cause the fluid, preferably air bubbles, to rise through the bath and over the surfaces of each individual package in each location, to mix the water adjacent all of the packages and cause efficient heat transfer. Simultaneously, fluid such as air is ejected up inverted channel ramps 60a and 60b, and ejected diagonally from the upper end outlets thereof in opposite directions on opposite sides of the vessel, thereby causing the aqueous bath liquid to circulate around the vessel. After the predetermined heating time for each entry, the package thereof is removed from its location, the selected sauce is removed from its location, the packages are opened and the two items combined on a plate for serving. If a vegetable entree is selected, a package of cooked vegetables of selected type is removed from its location, opened, and placed on the plate.

Experimental use of the apparatus has shown that it produces excellent high quality food products prepared appropriately for the cooking conditions of the particular items, yet without an on-site chef, with far less space required than conventionally necessary, and with controlled production.

If the apparatus is used to cook pasta, a rack not having the locations but employing the lower fluid flow tubes and the diagonal ramps may be used. If the fluid injected is air, bubbles pass up through the pasta, e.g., spaghetti, for bath mixing, evenly cooking the pasta, and separation of the pasta material. The starch that is cooked off the pasta rises to the surface, assisted by the bubbling action, at which point the air or water ejected from the diagonal tube upper end outlets ejects the starch from the bath, i.e., over the edge of the vessel into an appropriate surrounding container (not shown) for easy removal.

It is conceivable that certain details of the development described above could be modified from the preferred embodiment set forth and described as exemplary of the invention. Such variations to suit a particular type of installation or operation are considered to be part of the invention which is intended to be limited only by the scope of the appended claims and the reasonable equivalents thereto.

The embodiments of the invention in which an exclusive property or privilege is claimed are defined as follows:

I claim:

1. A food preparation cooker/rethermalizer comprising:
   a food heating vessel having sides and a bottom for retaining an aqueous bath, and including heat supply for heating the aqueous bath;
   a food locator rack in said vessel having a plurality of defined locations for supporting packaged food items to be heated;
   said rack having fluid outlets to said vessel beneath all of said locations to cause fluid to exit into the bath and agitate the bath over and past food items in said locations of said food locator rack; and
   a fluid connector on said rack for connection to a pressurized source of fluid.

2. The food preparation cooker/rethermalizer in claim 1 including fluid conducting tubes on said locator rack, having said outlets therefrom, and including upwardly diagonally oriented conduits to conduct pressurized fluid causing bath circulation.

3. A food preparation cooker/rethermalizer comprising:
   a food heating vessel having sides and a bottom for retaining an aqueous bath, and including a heater for heating the aqueous bath;
   open food support means in said vessel defining a plurality of separate locations for supporting food items to be heated, and having upper and lower portions;
   said food support means including gas conducting tubes having outlets at said lower portion to said vessel, beneath all said locations, to cause gas bubbles to exit into the bath and move up along and past food items on said food support means;
   connectors from said gas conducting tubes to a pressurized source of gas;
   said gas conducting tubes including upwardly sloped gas conducting ramps at opposite sides of said vessel sloped upwardly, in opposite directions.

4. The food preparation cooker/rethermalizer in claim 3 wherein said ramps have upper end outlets for ejection of gas and water therefrom, to cause bath circulation in said vessel.

5. A food preparation cooker/rethermalizer comprising:
   a food heating vessel having sides and a bottom for retaining an aqueous bath, and including a heater for heating the aqueous bath;
   a food support in said vessel;
   fluid conducting tubes in said vessel at an angle along said sides comprising an outlet oriented at an angle along said sides to cause bath circulation by fluid ejected from said outlet;
   said fluid conducting tubes comprising a pair of fluid outlets oriented in opposite directions along said opposite sides to cause bath circulation by fluid ejected from said outlets.

6. A food preparation heating vessel for an aqueous bath, comprising:
   a food heating vessel having sides and a bottom for retaining an aqueous bath, and having a heat source;
   an open food support means in said vessel for supporting food items to be heated;
   said food support means including fluid conducting tubes and having outlets from said tubes to said vessel for causing fluid to leave said tubes and flow between the food items; and
   at least one upwardly, diagonally ramped conduit adjacent one of said vessel walls, having an upper end with an outlet thereat, to cause fluid flow therefrom for circulation of the aqueous bath in said vessel.

7. The food preparation heating vessel in claim 6 characterized by said tubes having means for connecting to a pressurized gas fluid source, having central bubble tubes adjacent said vessel bottom, with bubble outlets therealong for flow of gas bubbles up along packaged food items in said food support means, and said at least one ramp conduit comprising a pair of such ramp conduits at opposite sides of said vessel diagonally oriented in opposite directions for effecting bath circulation in said vessel.

8. The food preparation cooker/rethermalizer in claim 1 characterized in that said heat supply means comprises a heater element embedded in rubber-type material bonded to said vessel on the outside thereof.

9. The food preparation cooker/rethermalizer in claims 8 characterized in that said heater element is an electric resistance heater coil embedded between layers of rubber-type material bonded to said vessel.

10. The food preparation cooker/rethermalizer in claim 9 wherein said rubber-type material is silicone polymer.

11. The food preparation cooker/rethermalizer in claim 1 including a graphic control panel;
said food support means having said plurality of locations for retaining food arranged in a geometric location pattern;
said graphic control panel having controls and indicators for each of said locations, arranged in a geometric control pattern visually simulating said geometric location pattern.

12. The food preparation cooker/rethermalizer in claim 1 including a housing, said vessel being in a vessel chamber in one portion of said housing;
said housing also defining an electronics control chamber;
a pair of spaceLl walls between said vessel chamber and said electronics control chamber forming a vertically elongated space therebetween, said pair of walls including a vessel chamber wall and an electronics control chamber wall;
air inlet opening means at the bottom of said space for admitting air, and air outlet opening means at the top of said space for exhausting air, so that said space acts like a chimney with thermal convection driven, ambient air flow therethrough for thermally isolating said electronics control chamber from said vessel chamber.

13. The thermalizing apparatus in claim 12 including a fluid inlet oriented for causing fluid generated circulation.

14. A pasta cooker comprising:
a pasta heating water vessel having sides, bottom, and an at least partially open top with a top outlet for starch cooked off the pasta in said vessel;
a pasta support in said vessel, comprising fluid conducting tubes including at least one diagonally upwardly extending tube oriented toward said top outlet and having a fluid outlet adjacent the upper end thereof, so that ejection of fluid from said outlet causes floating starch cooked off the pasta to be ejected through said top outlet; and
said tubes having means for connection to a fluid source.

15. The pasta cooker in claim 14 wherein said pasta support has fluid conducting bottom tubes adjacent the bottom of said basket, and orifices in said bottom tubes for ejecting fluid up past the pasta in said cooker to facilitate heat exchange at the pasta and elevate starch to the top of the bath.

16. The pasta cooker in claim 14 wherein said pasta support includes a pair of said diagonally upwardly extending tubes adjacent opposite sides of said vessel and having upper end outlets oriented in opposite directions to cause water circulation in said vessel, as well as starch ejection.

17. A pasta cooker comprising:
a pasta heating vessel having side and bottom walls for retaining an aqueous bath;
a pasta support in said vessel;
a pressurized gas conducting and emitting conduit in said vessel for causing gas bubbles to pass through pasta in said pasta support; and
a fluid conducting, bath circulating conduit in said vessel having an outlet oriented to cause bath circulation.

18. The food preparation cooker/rethermalizer in claim 1 wherein
said sides and bottom have interior surfaces and exterior surfaces;
vessel heater means on said exterior surfaces for heating the aqueous bath and food in said vessel;
said vessel heater means including polymer bonded to said exterior surfaces and electrical resistance heater elements embedded in said polymer; and
said heater elements having connection means for connection to an electrical power source.

19. The food preparation heating vessel in claim 18 wherein said resistance heater elements comprise helical coils, and said polymer is a silicone polymer.

20. The food preparation heating vessel in claim 19 wherein said polymer comprises layers of silicone rubber, with one layer adjacent to and bonded to said exterior surfaces, and said elements being embedded between said layers.

21. The food preparation cooker/rethermalizer in claim 1, further comprising water supply means for supplying additional water to said vessel to replace water lost by evaporation and removal with food items;
sensing elements at spaced, different vertical locations of said vessel, an upper one at the level desired for the bath, and a lower one below that level for detecting the differential sensed by said sensing elements; and
said sensing elements being operably associated with said water supply means for periodically actuating said water supply means to add supplemental water to said vessel when a predetermined differential is detected.

22. The food preparation cooker/rethermalizer in claim 21 wherein said sensing elements are temperature sensing elements.

23. The food preparation cooker/rethermalizer in claim 21 wherein said heater is attached to said vessel, and said upper sensor is above said heater.

24. The food preparation cooker/rethermalizer in claim 3, further comprising:
said vessel defining zones of the bath;
said heater comprising a plurality of heaters for said vessel;
said vessel having a plurality of defined locations in a geometric location pattern for supporting items to be thermalized in the bath;
said heaters being located at respective ones of said zones of said geometric location pattern;
a graphic control panel having controls and indicators for each of said zones, arranged in a geometric control pattern visually simulating said geometric location pattern whereby a thermal load in one zone does not materially drive the temperature in another zone up or down.

25. The thermalizing apparatus in claim 24 including a pressurized fluid inlet for bath agitation.

26. The thermalizing apparatus in claim 24 including a fluid inlet oriented for causing fluid generated circulation.

27. The food preparation cooker/retherrnalizer in claim 6, further comprising:

a housing having walls defining a heating chamber, a control chamber and an isolation space therebetween;

said food heating vessel being in said heating chamber, and said heat source comprising a heater for said vessel;

said isolation space having an ambient air inlet adjacent the bottom thereof and an air outlet adjacent the top thereof to thereby create a chimney-like convection flow of ambient air up therethrough, to thermally isolate said chambers.

28. The food preparation heating apparatus in claim 7, further comprising:

a housing defining a heating chamber and a separate control chamber;

said food heating vessel being in said heating chamber, and including said heat source;

electronic controls in said electronic control chamber;

two walls between said chambers, spaced from each other and defining a vertically elongated space therebetween, one of said two walls being a wall of said heating chamber, and the other wall being a wall of said control chamber;

air inlet opening means at the bottom of said space for inlet air flow;

air outlet opening means at the top of said space for outlet air flow into said heating chamber, whereby heat from said heating chamber creates thermally-generated, upward air flow through said space to isolate and cool said control chamber wall.

29. The food preparation cooker/rethermalizer in claim 1, further comprising:

open food support means in said vessel forming a plurality of defined locations for retaining individual food packages separated from each other;

said locations being arranged in a geometric pattern;

a graphic control panel for said cooker/rethermalizer including controls and indicators for the respective locations; and said graphic control panel being arranged in a geometric control pattern visually simulating said location pattern.

30. The food preparation cooker/rethermalizer in claim 29 wherein said control panel has boundary lines forming a plurality of outlines simulating all of said locations, each location-simulating outline including a timer control and an indicator.

31. The food preparation cooker/rethermalizer in claim 30 wherein said control panel also includes a separate segment with zones, each zone including actuator controls operably associated with said location-simulating outline controls for selective actuation of controls for food in each of said locations.

32. The apparatus in claim 5, further comprising:

said heater being on said vessel sides;

temperature sensors on said sides, including at least one upper sensor on one of said sides and one lower sensor adjacent said bottom, said upper and lower sensors being vertically spaced from each other and operably associated with said heater in a fashion to activate said heater when the average of the temperatures sensed by the upper and lower sensors drops to a predetermined value.

33. The apparatus in claim 32 wherein said heater is a heater jacket on said vessel sides.

* * * * *

UNITED STATES PATENT AND TRADEMARK OFFICE
CERTIFICATE OF CORRECTION

PATENT NO. : 5,445,062
DATED : August 29, 1995
INVENTOR(S) : Louis S. Polster

It is certified that error appears in the above-indentified patent and that said Letters Patent is hereby corrected as shown below:

```
Title page, item ]57], Abstract, line 7, "rise" should be --rises--.
Column 3, line 8, "modem" should be --modern--.
Column 5, line 11, "anti" should be --and--.
Column 7, line 54, "lap" should be --up--.
Column 8, line 53, "robber" should be --rubber--.
Column 8, line 55, "comers" should be --corners--.
Column 8, line 57, "comers" should be --corners--.
Column 9, line 38, "requiting" should be --requiring--.
Column 10, line 1, "Bernalse" should be --Bernaise--.
Column 13, Claim 9, line 4, "claims" should be --claim--.
Column 13, Claim 12, line 24, "spaceLl" should be --spaced--.
Column 14, Claim 27, line 67, "cooker/retherrnalizer" should be --cooker/rethermalizer--.
```

Signed and Sealed this

Seventh Day of May, 1996

Attest:

BRUCE LEHMAN

Attesting Officer    Commissioner of Patents and Trademarks